US006587558B2

(12) United States Patent
Lo

(10) Patent No.: US 6,587,558 B2
(45) Date of Patent: Jul. 1, 2003

(54) SYSTEM AND METHOD FOR VIRTUAL INTERACTIVE RESPONSE UNIT

(75) Inventor: William Lo, Arlington, VA (US)

(73) Assignee: Immequire, LLC, Arlington, VA (US)

( * ) Notice: Subject to any disclaimer, the term of this patent is extended or adjusted under 35 U.S.C. 154(b) by 0 days.

(21) Appl. No.: 09/772,342

(22) Filed: Jan. 29, 2001

(65) Prior Publication Data

US 2002/0101978 A1 Aug. 1, 2002

(51) Int. Cl.[7] .............................................. H04M 3/00
(52) U.S. Cl. ........................ 379/265.09; 379/88.04; 379/88.05; 379/266.09
(58) Field of Search ................ 379/266.09, 265.09, 379/88.04, 88.05

(56) References Cited

U.S. PATENT DOCUMENTS

| 5,590,188 A | 12/1996 | Crockett ................ 379/225 |
| 5,717,739 A | 2/1998 | Dyer et al. .............. 379/67 |
| 5,771,273 A | 6/1998 | McAllister et al. ........ 379/67 |
| 5,901,214 A | 5/1999 | Shaffer et al. ........... 379/220 |
| 6,058,179 A | 5/2000 | Shaffer et al. ........... 379/220 |
| 6,070,142 A | 5/2000 | McDonough et al. ....... 705/7 |
| 6,115,693 A | 9/2000 | McDonough et al. ...... 705/10 |
| 6,314,176 B1 * | 11/2001 | Gunasekar |

* cited by examiner

Primary Examiner—Ahmad F. Matar
Assistant Examiner—Rasha AL-Aubaidi
(74) Attorney, Agent, or Firm—Roberts, Abokhair & Mardula, LLC

(57) ABSTRACT

A virtual interactive response (VIR) system mimics and enhances interactive voice response (IVR) technology by using humans to drive the voice recognition unit (VRU) speech recognition functionality. This VIR system initiates a dialogue with the customer by prompting the customer with an initial welcoming message. Calls from a customer are initially made in a first region having high labor costs, but are then directed to an overseas location using voice over Internet protocol (VOIP) or other voice communications technology. The calls are then directed to an appropriate human agent at the overseas location who then listens to the customer's query and makes a decision on how to respond to the customer.

19 Claims, 3 Drawing Sheets

SYSTEM AND METHOD FOR VIRTUAL INTERACTIVE RESPONSE UNIT

INTRODUCTION

This invention relates generally to the call center industry. More particularly, the present invention is a system for using human interaction to mimic and enhance an Interactive Voice Response (IVR) technology without requiring the customer to select from menu driven options and without using a Voice Response Unit to gather customer input.

BACKGROUND OF THE INVENTION

In the modern business world, telephone communications have become a tool of strategic importance. The telephone essentially allows modern business to operate. Each day, countless businesses utilize the telephone system to conduct a broad range of business transactions.

In order to increase the utility of telephones, a vast array of answering machines, voice mail, automated forwarding services, and the like have been developed. Each of these devices or services is intended to increase the usefulness of the telephone in a specific way.

Some companies rely heavily on the use of human operators as the main sales tool in their business. In these companies a caller is immediately referred to an agent who is trained to handle a sales inquiry. The operators typically describe to the customers the products or services offered, answer or respond to any questions the customer may have, and take orders from the customers. This method, however, necessarily requires that each operator working for the company be trained and knowledgeable regarding all aspects of the products or services offered in order to answer any potential question a customer may have. This training must be thorough enough to instill in the customer confidence that the operator is a credible source of information regarding the products or services offered.

If a customer cannot receive satisfactory answers to his or her questions from a knowledgeable, credible source, the sales of the company will suffer. Unfortunately, training each and every operator thoroughly enough to instill such knowledge and confidence is a difficult and expensive undertaking. It often takes a very long time in order to develop such knowledge and credibility. The turnover rate of operators can be quite high, thus significantly increasing the difficulty of providing a knowledgeable and trained staff of operators. Indeed, many contact centers experience 100% staff turnover each year. Currently, only a few methods exist to overcome this obstacle.

Some companies, in an effort to overcome this obstacle have resorted to multiple layers of operators. For example, if an initial operator lacks the experience or knowledge to answer a customer's question, the customer may be transferred to a supervisor who has a higher level of knowledge or skill in answering the question. While this method has the advantage of reducing the need to train every operator in all aspects of the products or services offered, it also has several drawbacks. Sometimes, customers do not wish to take the time to speak with a supervisor. They may instead elect to terminate the encounter. This results in lost sales to the company. Additionally, some customers may lose confidence in the ability of the company to provide adequate and accurate information when their questions cannot be immediately answered. Again this may result in lost sales. Finally, this method can suffer if an unusually large number of questions must be referred to a supervisor in a very short period of time. Such a situation can overwhelm the supervisor's ability to deal with the questions in a timely fashion. Again, customers may choose to terminate the discussion rather than wait for further answers to their questions.

Catalogue sales companies are not the only businesses to suffer these problems. Companies often have a help or support line where customers can call with questions or problems they are experiencing. These customer support lines provide a valuable service to the customer and often enhance the ability of the company to compete in the market place. Unfortunately, staffing such help lines can be very expensive. As with catalogue sales companies, the operators staffing the support lines must be thoroughly trained in all aspects of the product. If they receive questions that cannot be answered, problems similar to those described above may occur. Customers may become frustrated and lose confidence in the ability of the company to support their own product. As a result reputation and business can suffer.

In the effort to reduce costs and to provide additional services or information to their customers, many companies employ VRU's, where the caller moves through a series of tree menus by pressing buttons on the phone keypad. Using this method, the caller is in theory able to route their call to the most appropriate person or order various products or services, or obtain the information they need in an electronic format. Because VRU's are able to direct the user to the appropriately skilled person or to an electronic response that is pre-recorded by a person with the appropriate level of skill and experience, VRU's reduce the need for operators with this level of skill and experience.

There are problems with VRU solutions, however. A tree menu system might, for example, require a user to traverse many menu levels before getting the appropriate response. This wastes a user's time and results in frustration by the user.

Another difficulty with traditional VRU's is that frequently menus do not allow the user to obtain the information desired. In some cases, the caller has a request that has not been anticipated by the designers of the menu system and therefore the answer to the request cannot be found. In other cases, the VRU might be mis-programmed, sending the caller into an endless loop with no escape available. In other cases, the caller might not understand the terminology used by the VRU or which option to choose for her inquiry. For example, the user might not understand that she should press "1" for billing inquiries when she really wants to change her billing address.

The requirement to have a DTMF keypad poses another problem for VRU's. Sometimes users have only a rotary dial phone, preventing them from pressing keys. Other callers are unable to understand instructions on how to use the keypad.

Yet another difficulty of VRU's is that they frequently do not allow manual intervention by a live agent at a point where a user may desire such intervention. Thus the system does not generally allow a user to ask questions to a live agent until the user has exhausted all other options. This may take an extended amount of time and result in user frustration and lost business.

Indeed the amount of time spent searching through the VRU for the desired information is really one of the major costs of the VRU. Customers in some instances have become accustomed to spending minutes hunting through menus to get the information that they desire. If their time spent hunting through menus were truly valued at a market rate, the overall cost of a VRU system would be huge.

Another type of slightly enhanced IVR functionality is currently available in the marketplace. In some directory assistance applications, U.S. based operators listen to the city and state and name of the party that is being requested. The operator can then respond in one of two ways. The operator can activate an announcement to communicate the number to the listener, assuming that the name and location are understood, or the operator can engage the listener in a voice interaction to get further information about the name or the location of the party that is being requested.

While this form of interaction generally works, the cost of operators in the United States can be significant due to the high cost of labor in the U.S.

In order to reduce the use of high cost U.S. operators, a VRU enhanced with speech recognition can sometimes be used. Some companies also use this enhanced functionality to help users traverse a traditional VRU menu without using a DTMF keypad. In these applications, instead of "pressing 1", the caller is able to "say 1" to respond to the VRU's queries.

Difficulties associated with the use of an enhanced VRU's include almost all of the problems associated with a regular VRU as described above like lost time, increased frustration, unclear menu options, misprogramming, and lack of manual intervention options. Additional difficulties associated with these enhanced VRU's include recognition of only a limited vocabulary and a poor ability to parse natural language.

While natural language processes are improving and some are quite capable of recognizing connected speech, such as systems from Dragon Systems and others, such a voice response system must be extensively trained on the voice of the user. When many different users are attempting to get information, there is no ability of the system to adequately train and therefore recognize connected speech in most cases. Further, the ability of such enhanced VRU's to recognize vocabulary that may be spoken by those with foreign accents is also limited. If a user is of Chinese origin, for example, and is speaking English, the device may not be able to understand the words that are being spoken by the user.

When one takes into account the variations in voice associated with age, sex, regional accents, foreign accents, and other characteristics, the ability of an VRU with speech recognition capabilities to understand vocabulary is limited indeed.

Another problem of enhanced VRU's is the customer's uncertainty with how to classify their inquiry. Certain companies or industries may have a particular vocabulary that the VRU is taught to recognize, but is not understood or known by a user. For example, if a user desires to talk to someone in a hiring department, the VRU may only recognize "personnel" or "human resources" as entries that allow the individual to be branched to that particular location. It the user does not know to use those terms, the user will be frustrated in the use of the VRU.

What would be truly useful is a system that mimics and enhances the IVR technology but utilizes humans to drive the VRU speech recognition functionality. This system would recognize the full range of human vocabulary and allow timely, accurate routing to the appropriate person and/or timely and accurate delivery of the appropriate information to the caller. Further, such a system would take advantage of highly skilled labor outside of the United States to provide a virtual IVR functionality that is low cost, while still providing immediate comprehension of a user's request for information.

SUMMARY OF THE INVENTION

The present invention is known as a virtual interactive response unit (VIRU) that uses a contact center manned by highly trained workers who are outside of the United States. This system allows such workers to hear inquiries from users and branch to specific responses that are relevant to users' requests.

In view of the above, it is therefore an object of the present invention to reduce frustration with current VRU systems that cause wasted substantial wasted time, have unclear menu choices, have mis-programmed menu choices, send users into endless loops, do not have manual intervention options, and prevent users without DTMF (i.e., TouchTone™) keypads from using them.

It is a further object of the present invention to utilize skilled workers outside of the United States to respond to directory assistance and other types of queries from callers in the United States.

It is a further object of the present invention to utilize voice over IP (VOIP) or other voice communications technology as a means of conveying requests for information to foreign workers at a foreign location.

It is a further object of the present invention to have a VIRU having enhanced capability to process natural language requests.

It is still a further object of the present invention to have a VIRU that responds to voice requests from those of varying age, sex, national origin, and regional accents.

It is a further object of the present invention to reduce or eliminate the need for a user to traverse multiple menus of queries before obtaining the live agent, pre-recorded voice, or other media response required.

It is a further object of the present invention to reduce the need for training highly skilled agents to answer customer queries by making it possible for a remote agent to send the customer the requested information in a prerecorded multimedia format.

It is still another object of the present invention to reduce the initial capital costs for implementing the voice response unit.

These and other objects of the present invention will become apparent from a review of the specification that follows.

As noted above, the present invention is embodied by a system that mimics and enhances IVR technology by using humans to drive VRU speech recognition functionality. The system of the present invention initiates a dialogue with the customer by prompting the customer with an initial welcoming message. Calls from a customer are initially made in the United States, but directed to an overseas location using VOIP or other voice communications technology. The calls are then directed to an appropriate agent, who is a human being, who then listens to the customer's query and makes a decision on how to respond to the customer.

One aspect of the present invention is a method of producing a routed telephone call. The method includes a step of receiving a one-way audio transmission at an operator station via a network, and then obtaining a human judgment of an appropriate call routing option based on the content of the one-way audio transmission. The method further includes transmitting a call routing command signal via the network to a call center wherefrom the one-way audio transmission originated. A telephone call received at the call center that originated the one-way audio transmission is routed based on the call routing command signal.

According to one embodiment, the received one-way audio transmission is in a voice over Internet Protocol format. According to an alternative embodiment, the received one-way audio transmission is in the format of a recorded voice signal.

Another aspect of the present invention is a method of screening telephone calls. The method includes a step of receiving a telephone call at a call center, and transmitting a one-way audio transmission, derived from the received telephone call, via network to a remote screening facility. The method further includes routing the received telephone call within the call center based on a screening command signal received from an operator at the remote screening facility. According to one embodiment, the transmitted one-way audio transmission is in a voice over Internet Protocol format. According to an alternative embodiment, the transmitted one-way audio transmission is in the format of a recorded voice signal.

Yet another aspect of the present invention is that its methods may be practiced by a wide variety of organizations to enhance the operation of their call centers. Such entities include (without limitation) for-profit businesses, non-profit businesses, governmental entities, international pan-governmental entities, and charitable entities.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Figure 1:
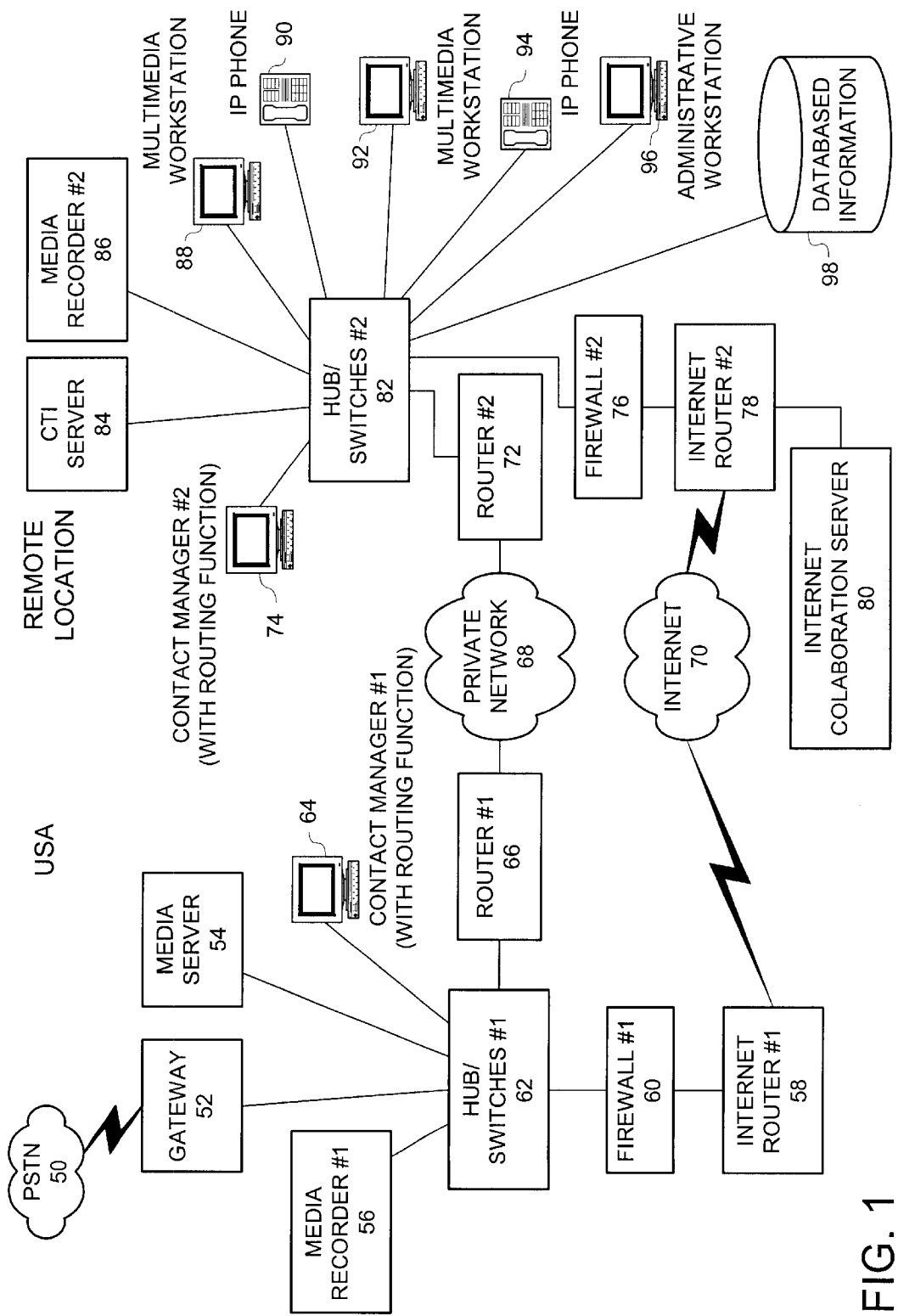
FIG. 1 illustrates schematically an overview of the architecture of the present invention.

A system according to the present invention mimics and enhances IVR technology by using humans to drive VRU speech recognition functionality. This system initiates a dialogue with the customer by prompting the customer with an initial welcoming message. Calls from a customer are initially made in the United States (or any other place where labor costs are relatively expensive), but directed to an overseas location using VOIP or other voice communications technology. The calls are then directed to an appropriate agent, who is a human being, who then listens to the customer's query and makes a decision on how to respond to the customer.

In responding to the customer the agent has the option to direct the customer to one of several response mechanisms. For example, after listening to the customer query, the agent can trigger an automated response from a list of prerecorded messages stored on a server. As another example, a customer may inquire as to the store hours for a particular establishment. The agent quickly determines if a prerecorded response does exist to answer that query and retrieve and play the response to that query over the network to the user at that point.

Another response from the agent would be to send the customer to a live "local" agent, that is a person in a call center in the same country as the caller who can respond to the query for information. A local (as opposed to remote) agent may be important to clients because they wish to eliminate any chance for misunderstanding due to the accent of an overseas agent. If a customer places an inquiry regarding a bill or invoice, the local agent could respond to the user and ask for account numbers and related information.

Another response from the agent would be to send the customer to another live "remote" agent or initiate a live conversation with the caller his/herself. In this case, the agent would be trained to interact directly with the customer.

In other cases, an agent may request further information using a prerecorded voice or other media response. This prerecorded message may indicate to the user to provide a fax number or e-mail address to which information can be sent.

The advantages of the present invention are, in part, a lower cost for implementation because a VRU need not be purchased or integrated into a particular business. The only major additional costs associated with this invention beyond what would be typical in a call center are a media recorder and a media server(s). The system of the present invention utilizes lower cost remote operators in foreign countries who understand the English language and can interpret foreign accents, regional accents, and words in a much more efficient and robust fashion. Further, the system of the present invention uses low cost VOIP technology or other voice communications technology to reduce the cost of the transmission of voice signals to overseas agents. While not necessarily providing toll call quality sound, the voice that is sent to agents is sufficient to allow them to understand the response quite readily. The response sent to the end customer is typically driven from a media server located in the US and provides toll quality sound because it uses the PSTN to transmit the message to the end customer.

In addition to the above advantages, the VIRU accepts a much larger vocabulary since a human agent interprets the initial inquiry. Thus, the vocabulary ability of the human agent is much larger than that commercially available on VRU's. Further, the human agent can process natural language, which is also difficult for current day VRU's By the ability to understand different languages, different speakers, with varying voice, age, sex and regional accents, the VIRU greatly minimizes frustration with menu options and, in many cases, can eliminate manual options and the associated frustration of a user having to traverse multiple levels of a menu system.

Referring to FIG. 1, the overall architecture of the present invention is illustrated. A user places a call for information over the public switch telephone network 50 into a particular telephone number, which is answered at a gateway 52. The gateway 52 receives the incoming voice call and converts it to Internet Protocol (IP). This gateway consists of a traditional PBX/ACD and compression hardware, or, in the alternative, may be a single server based unit, such as a Cisco DT-24 gateway. The media server 54 comprises storage of certain messages that can be played back to the user via the gateway 52 and thence over the PSTN 50. Media recorder 56 allows for the recording of the incoming inquiry from the user for subsequent transmission over the network.

Hub switches 62 allow all of the elements within the local area network of the present invention to communicate with one another. The contact manager 64 comprises routing functionality and identifies, tags, and routes the incoming contact regardless of the media type (voice, video, chat, email). Depending upon the hardware that is used and the workload, this contact manager 64 may be a single unit or multiple units with load balancing capability. Equipment that can serve the needs of the contact manager is, for example and without limitation, the Cisco MCS-7835, CCM server (Cisco Call Manager), ICS-2000, ICM server (intelligent contact manager), and the Cisco SW-APPS-IVR 24 IP VRU (Internet Protocol Voice Response Unit).

The media server 54 stores prerecorded information in the form of voice, video, graphics or other media files. These files are stored in standard formats, such as, but without limitation, wav, MP-3, RAU, and WMP. Information stored in the media server 54 can be routed to the customer by a command from the remote agent (discussed below). The Cisco SW-APPS-IVR 24 IP VRU provides this functionality for the voice over IP of the present invention.

The media recorder 56 has the ability to record live media at any time during the life of the contact as required by the systems administrator. For example, rather than a live interaction of the user with the agent, a recording can be made of the query from the user and sent to the remote agent, or, an interaction with the remote agent can be recorded as it occurs.

Messages reach the remote location after first traversing a router 66 connected to a private network 68 through a router 72 at the remote location to subsequent components as disclosed below.

Alternatively, once a message is received, hub switch 62 can route the call to internet router 58 through a protective firewall 60. Thereafter, the message proceeds from the Internet router 58 over the Internet 70 to an internet router 78 for subsequent operations.

For those calls that are routed to the remote location over the Internet, the call is received at internet router 78. The router 78 is connected to an internet collaboration server 80, which allows for multimedia internet applications, including, but not limited to, live chat, white board, web collaboration, voice over IP, and other applications. Calls are then subsequently routed through firewall 76 to the other components of the system.

Once the user's inquiry is within the remote location, it is routed as appropriate to various components of the remote location. For example, the CTI server 84 allows information to be automatically displayed on an agent's screen based upon a tag assigned to it by the contact manager 64 when the call first came in. Various multimedia workstations 88, 92 allow an agent to interact with the incoming message and provide appropriate information from media recorder 86 or to direct that media server 54 serve the appropriate information to the user. An administrative workstation 96 is also present in the invention to allow administration of personnel, scheduling, and other matters within the remote location. IP telephones 90 and 94 allow for a telephonic interaction with the user to take place where that is necessary.

As noted above, the multimedia workstations 88, 92 allow for agents to view and respond to incoming contacts from the customer using the full range of internet multimedia communications capability, such as voice over IP, chat, email, video, white board, and other ways known in the art. The database 98 stores information relative to customers and/or information that is needed to render the services of the present invention.

Figure 2:
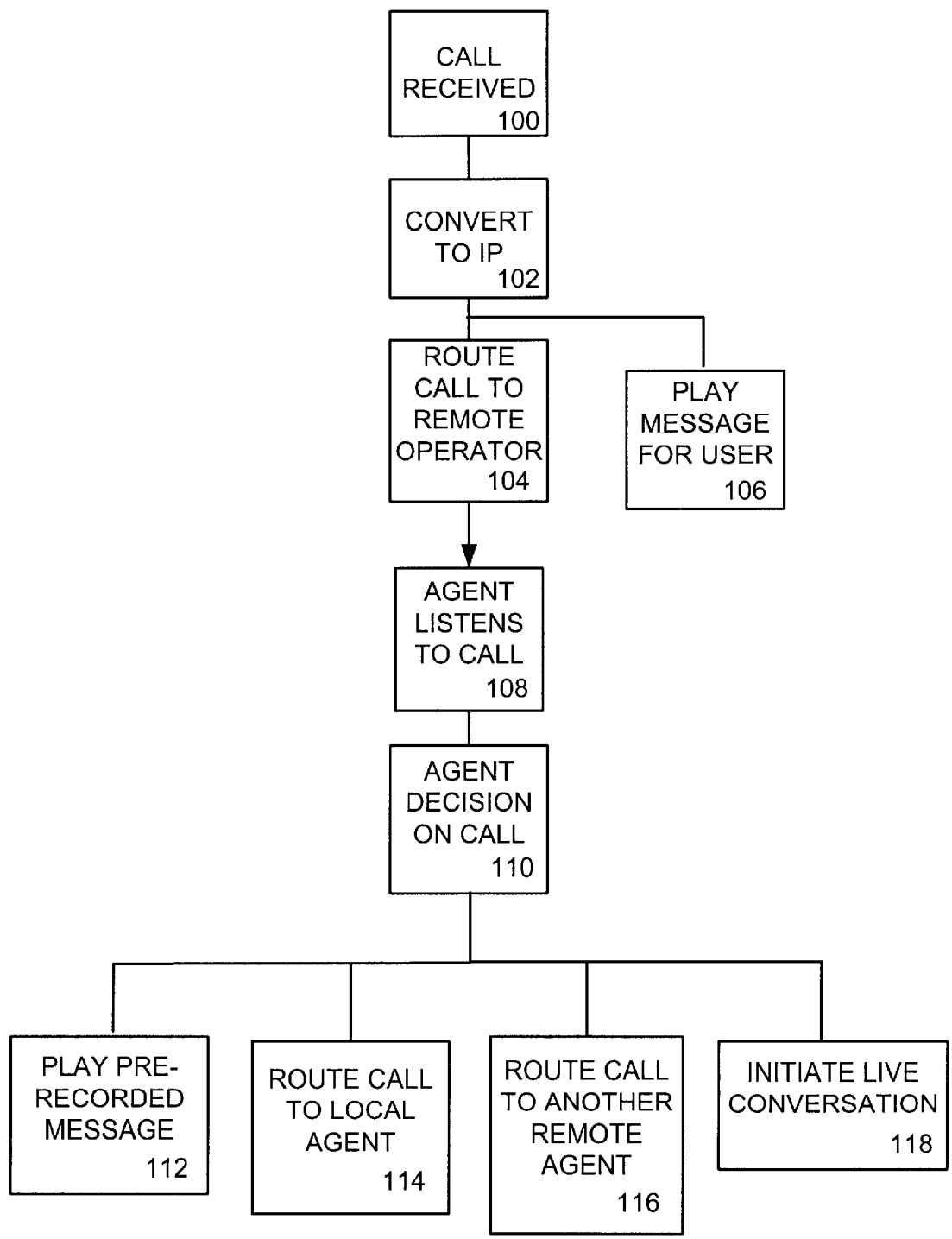
FIG. 2 illustrates a flow chart of the response, according to an embodiment of the present invention, of a VIRU to a user inquiry.

Referring to FIG. 2, one alternative process flow of the present invention is illustrated.

A caller initially makes a call, which is received 100 in the United States. The call is converted to internet protocol 102 and subsequently routed to a remote operator 104 over a network.

The customer is then played a message 106 asking the customer if the system of the present invention can provide assistance. The customer then responds to the inquiry message and the remote agent listens to the message in real time 108.

The agent then makes a decision based upon the request 110 and provides a number of options. The agent can play a prerecorded message 112 that is responsive to the inquiry of the user, the agent can route the message to a "local" agent for response 114, the agent can route the inquiry to another remote agent 116, or the agent can initiate a live telephonic interaction with the user 118 in order to further clarify the problem or provide a response.

Figure 3:
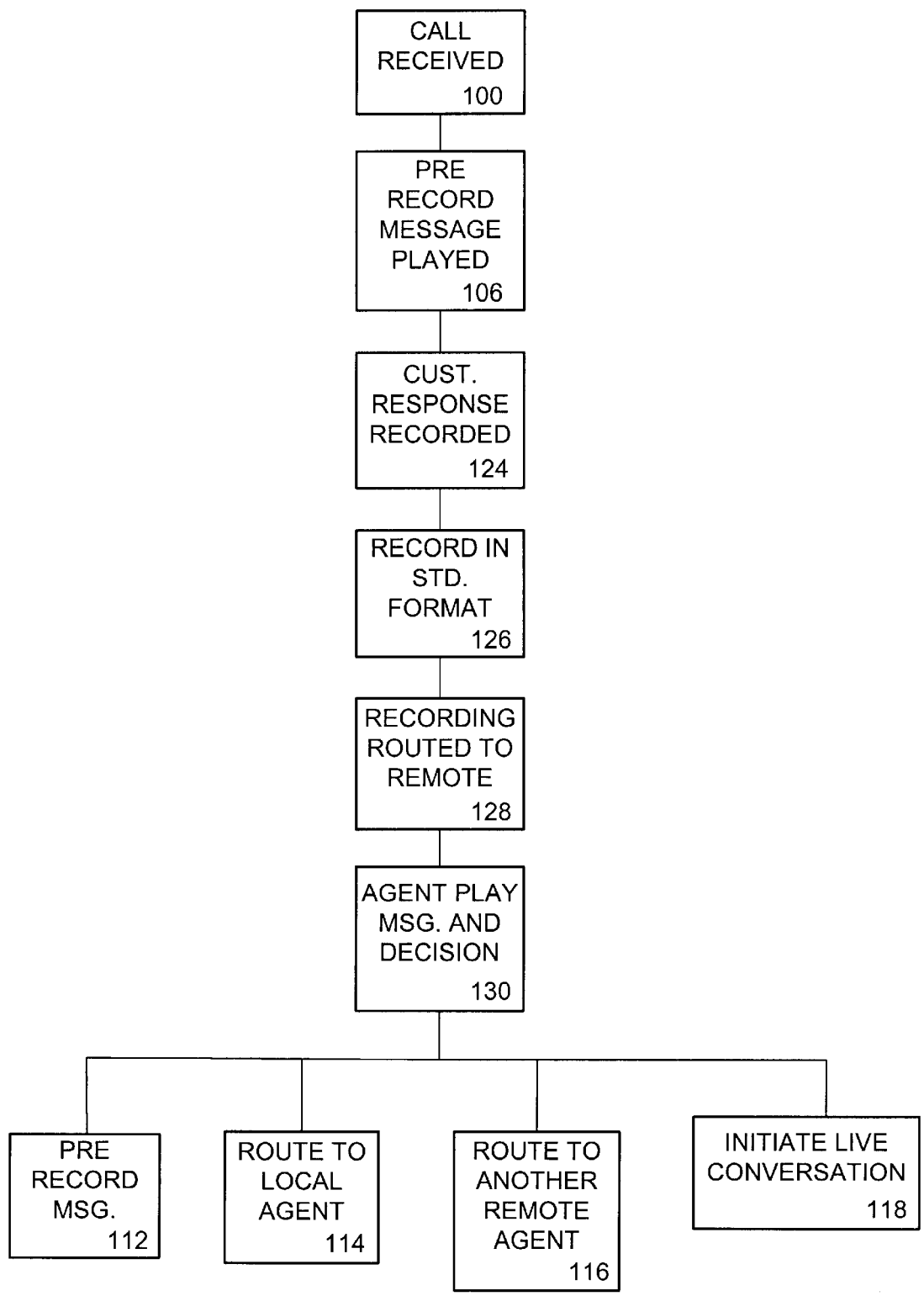
FIG. 3 illustrates a flow chart of the response, according to an alternate embodiment of the present invention, of a VIRU to a user inquiry.

Referring to FIG. 3, an alternative flow of calls received by the present invention is illustrated. A user first makes a telephone call which is received 100 in the United States. The customer is then played a prerecorded message asking how the system of the present invention can help 106. The customer then responds with the inquiry, which is recorded 124. The recorded inquiry is then saved as a file in a wav, MP-3, RAU, and/or WMP format, although this is not meant as a limitation. As other formats of data storage emerge, these will also be suitable for the present invention.

The recording is then routed to the remote agent 128 for response. The agent listens to the recorded message 130 and performs any number of options. The agent can play a prerecorded message responsive to the user's inquiry 112, the agent can route the inquiry to a local agent 114, the agent can route the inquiry to another remote agent 116, or the agent can initiate a live telephonic interaction with the user 118.

A system and method of creating a virtual interactive response unit has now been illustrated. It will be appreciated by those skilled in the art that other architectures and equipment suites can be used to affect the objectives of the present invention without departing from the scope of the invention as illustrated. For example, the various remote locations can be in any number of countries so long as there is an ability of the remote agents to understand the English language. Such countries as India, Nigeria, Ghana, Canada, Ireland, Australia, New Zealand, the Philippines, or any other country where English is a common language would be suitable. The key aspect of any such country is that the cost of labor be less expensive than the United States and that English be fluently spoken by any of the remote operators.

The present invention has been described in terms of preferred embodiments, however, it will be appreciated that various modifications and improvements may be made to the described embodiments without departing from the scope of the invention.

What is claimed is:

1. A method of producing a routed telephone call within a call center, the method comprising:

receiving an audio transmission in a voice over Internet Protocol format at an operator station via a network, the operator station being located in a different country than the call center;

obtaining a human judgment of an appropriate call routing option based on the content of the audio transmission; and transmitting a call routing command signal via the network to the call center wherefrom the audio transmission originated;

wherein a telephone call received at the call center originating the audio transmission is routed within the call center based on the call routing command signal.

2. The method of producing a routed telephone call, as recited in claim 1, wherein the call center is operated by an entity selected from the group consisting of: a for-profit business entity, a non-profit business entity, a governmental entity, a charitable entity, and an international pan-governmental entity.

3. A method of producing a routed telephone call, the method comprising:

receiving a one-way audio transmission at an operator station via a network;

obtaining a human judgment made by an operator at the operator station of an appropriate call routing option based on the content of the one-way audio transmission; and transmitting a call routing command signal via the network to a call center wherefrom the one-way audio transmission originated;

wherein a telephone call received at the call center that originated the one-way audio transmission is routed based on the call routing command signal.

4. The method of producing a routed telephone call, as recited in claim 3, wherein the received one-way audio transmission is in a voice over Internet Protocol format.

5. The method of producing a routed telephone call, as recited in claim 3, wherein the received one-way audio transmission is in the format of a recorded voice signal.

6. A method of screening telephone calls, the method comprising:

receiving a telephone call at a call center;

transmitting a one-way audio transmission, derived from the received telephone call, via network to a remote screening facility; and routing the received telephone call within the call center based on a screening command signal received from an operator at the remote screening facility.

7. The method of screening telephone calls, as recited in claim 6, wherein the transmitted one-way audio transmission is in a voice over Internet Protocol format.

8. The method of screening telephone calls, as recited in claim 6, wherein the transmitted one-way audio transmission is in the format of a recorded voice signal.

9. An operator station for routing telephone call within a call center, the operator station comprising:

a processor;

a memory in addressable communication with the processor, the memory bearing software instructions adapted to enable the processor to cause the operator station to perform the actions of:

receiving an audio transmission in a voice over Internet Protocol format at the operator station via a network, the operator station being located in a different country than the call center;

obtaining a human judgment of an appropriate call routing option based on the content of the audio transmission; and transmitting a call routing command signal via the network to the call center wherefrom the audio transmission originated;

wherein a telephone call received at the call center originating the audio transmission is routed within the call center based on the call routing command signal.

10. An operator station for routing a telephone call, the operator station comprising:

a processor;

a memory in addressable communication with the processor, the memory bearing software instructions adapted to enable the processor to cause the operator station to perform the actions of:

receiving a one-way audio transmission at the operator station via a network;

obtaining a human judgment made by an operator at the operator station of an appropriate call routing option based on the content of the one-way audio transmission; and transmitting a call routing command signal via the network to a call center wherefrom the one-way audio transmission originated;

wherein a telephone call received at the call center that originated the one-way audio transmission is routed based on the call routing command signal.

11. The operator station for routing a telephone call as recited in claim 10, wherein the received one-way audio transmission is in a voice over Internet Protocol format.

12. The operator station for routing a telephone call as recited in claim 10, wherein the received one-way audio transmission is in the format of a recorded voice signal.

13. An apparatus for screening telephone calls, the apparatus comprising:

a processor;

a memory in addressable communication with the processor, the memory bearing software instructions adapted to enable the processor to cause the apparatus to perform the actions of:

receiving a telephone call at a call center;

transmitting a one-way audio transmission, derived from the received telephone call, via network to a remote screening facility; and routing the received telephone call within the call center based on a screening command signal received from an operator at the remote screening facility.

14. The apparatus for screening telephone calls as recited in claim 13, wherein the transmitted one-way audio transmission is in a voice over Internet Protocol format.

15. The apparatus for screening telephone calls as recited in claim 13, wherein the transmitted one-way audio transmission is in the format of a recorded voice signal.

16. A directory assistance apparatus comprising:

a processor;

a memory in addressable communication with the processor, the memory bearing software instructions adapted to enable the processor to cause the directory assistance apparatus to perform the actions of:

receiving a telephone call from a calling party;

transmitting a one-way audio transmission, derived from the received telephone call, via network to a remote screening facility; and providing the calling party with a telephone number based on a screening command signal received from an operator at the remote screening facility.

17. The directory assistance apparatus as recited in claim 16, wherein the transmitted one-way audio transmission is in a voice over Internet Protocol format.

18. The directory assistance apparatus as recited in claim 16, wherein the transmitted one-way audio transmission is in the format of a recorded voice signal.

19. A method of screening telephone calls, the method comprising:

receiving a telephone call at a call center;

transmitting a one-way audio transmission, containing natural language content from the received telephone call, via network to a remote screening facility; and routing the received telephone call within the call center based on a screening command signal received from an operator hearing the natural language content at the remote screening facility.

\* \* \* \* \*